(12) United States Patent
Kaminsky

(10) Patent No.: US 6,587,889 B1
(45) Date of Patent: Jul. 1, 2003

(54) JUNCTION MANAGER PROGRAM OBJECT INTERCONNECTION AND METHOD

(75) Inventor: David L. Kaminsky, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/543,969

(22) Filed: Oct. 17, 1995

(51) Int. Cl.[7] .................................................. G06F 9/54
(52) U.S. Cl. ...................................... 709/316; 709/318
(58) Field of Search ................................. 395/680, 683, 395/200.2; 709/300, 303, 304, 316

(56) References Cited

U.S. PATENT DOCUMENTS

| | | | | |
|---|---|---|---|---|
| 4,912,629 A | * | 3/1990 | Shuler | 707/206 |
| 5,041,970 A | * | 8/1991 | Desjourdy | 711/212 |
| 5,339,418 A | | 8/1994 | East et al. | |
| 5,434,975 A | * | 7/1995 | Allen | 395/680 |
| 5,437,031 A | * | 7/1995 | Kitami | 395/680 |
| 5,446,901 A | * | 8/1995 | Owicki et al. | 395/680 |
| 5,598,562 A | * | 1/1997 | Cutler et al. | 709/104 |
| 5,764,985 A | * | 6/1998 | Smale | 709/302 |

FOREIGN PATENT DOCUMENTS

| | | | | |
|---|---|---|---|---|
| EP | 0108338 | | 10/1983 | G06F/15/40 |
| EP | 0514112 | | 5/1992 | G06F/15/40 |
| EP | 05114112 | * | 5/1992 | G06F/15/40 |

OTHER PUBLICATIONS

A.S. Tanenbaum 'Operating Systems: Design & Implementation', Prentice–Hall International, Inc., Englewood Cliffs, NJ, US, XP0002023005, p. 60, paragraph 2–p. 75, paragraph 3.

SAC—The Thirteenth Annual International Computer Software and Applications Conference, Sep. 20, 1989, Orlando, Fl, US—pp. 130–135, XP000091496 Peiyi Tang et al 'A Parallel Linked List for Shared–Memory Multiprocessors' * the whole document*.

Software Practice & Experience, vol. 17, No. 1, Jan. 1987, Chichester, Sussex, GB. pp. 1–4, XP000004698, H.W.Glaser et al 'Lazy Garbage Collection', *p. 2, paragraph 3–paragraph 5*.

* cited by examiner

Primary Examiner—St. John Courtenay, III
(74) Attorney, Agent, or Firm—Edward H. Duffield

(57) ABSTRACT

The junction manager in the present invention eliminates the need for a separate request broker or manager and eliminates, as well, the need for each junction to propagate each state change. Instead, the state change of each object to be interconnected is reported once by the junction manager function process either located in or used by each object desiring to do so, to a shared memory space. "Processes" in each object's junction manager (we use the term process to represent processes, threads or objects themselves) which are thus logically connected or "joined", and which may depend on one another, then query the shared memory space to obtain information about the state of a junction with another object that is of interest to them.

20 Claims, 11 Drawing Sheets

JUNCTION MANAGER PROGRAM OBJECT INTERCONNECTION AND METHOD

This invention describes a "junction manager" and process that improve upon the junction object interconnect technology described in Program Object Interconnection and Method, my co-pending, commonly assigned patent application, Ser. No. 08/417,582, filed Apr. 6, 1995.

1. Field of the Invention

This invention relates generally to computer programming methods and, in particular, to object oriented programming and to methods of connecting independent program objects for communicating or for sharing data in such programming constructs.

2. Background of the Invention

OMG's CORBA (Common Object Request Broker Architecture) provides for distribution of interobject data and communication based on remote procedure calls (RPCs). In this model, one program object makes a method call against another, possibly remote, program object. The called, possibly remote, object executes the method and returns results to the caller. This model is simple and eases the transition from uniprocessor to multiprocessor programming environments, but it suffers from inherent latency. Unless the calling object uses complicated, asynchronous callbacks, it must wait for the called object to perform the requested task and respond.

U.S. Pat. No. 5,396,630 commonly assigned to the Assignee of the present application, is incorporated herein by reference as an example of the registry and messaging approach described above, specifically for an object request broker type of object programming communication environment.

In my aforementioned patent application, state changes are propagated among object-connecting junctions. When a state change occurs at one object's junction, the new state is sent to each connected object's junction. Junctions for objects are connected in a circularly-link list. Thus, the junctions form a logical ring for sharing data, such as changes of state of one or more objects.

Using my prior patent application, when N object junctions are connected, propagating state changes or data requires that N−1 messages be sent (one to each junction, excluding the junction initiating the propagation), and each junction participates in forwarding the data or message.

OBJECT OF THE INVENTION

It is an object of this invention to provide an improved mechanism and process for eliminating multiple sending and exchanging of synchronization and state messages among interconnectable program objects.

It is a further object of this invention to provide for an improved object request broker function without either the broker entity or the need for the messaging overhead associated with prior art program object request brokers.

BRIEF SUMMARY OF THE INVENTION

The junction manager in the present invention eliminates the need for a separate request broker or manager and eliminates, as well, the need for each junction to propagate each state change. Instead, the state change of each program object (hereinafter simply referred to as "object") to be interconnected is reported once by the junction manager function process either located in or used by each object desiring to do so, to a shared memory space. "Processes" in each object's junction manager (we use the term process to represent processes, threads or objects themselves) which are thus logically connected or "joined", and which may depend on one another, then query the shared memory space to obtain information about the state of a junction with another object that is of interest to them. The junction manager function used by the object services each query by accessing and returning from the shared memory space the next chronologically posted state that the requesting process has not previously seen. For example, if the state of the junction has changed from S0 to S1 to S2, the current state is S2; but, if a process P has not queried the junction's state since it was S0, then the junction manager function of the requesting process P would return S1 to process P's request. S2 would be returned on the P's subsequent query.

Processes can access and read only the state changes for a queried junction that occur after the processes attach to an object's junction by accessing shared memory. In the example above, if a process P2 attached to a junction after the state changed to S2, but before the junction again changed its state, then P2's first query via its junction manager process would return S2; P2 would never see S0 or S1.

Processes, such as objects, can perform a number of operations when executing sub-processes to act as junction managers as listed briefly below:

- Create a new junction with an initial state and no attached processes.
- Attach to (i.e., access in shared memory) another object's junction data. Once a process has attached to a junction's data, it is eligible to query or alter the junction's data state; however, unattached process can neither query nor alter
- a junction's state data.
- Set the junction state data.
- Query the junction's state data.
- Unlink a junction from an object. After unlinking, a process can neither query nor alter a junction's state data.
- Destroy a junction entirely.

DETAILED DESCRIPTION OF THE PREFERRED EMBODIMENT

Data Structures

Use of the junction manager functions of this invention does not require any particular Application Programming Interface (API). Rather processes (objects) avail themselves of the junction manager functions by manipulating the junction manager's shared memory data structures directly. (of course, it is possible to implement an API that accomplishes the data structure manipulations and make the API available to processes running anywhere in the computer system.)

The junction manager function for each object of this invention uses a shared access computer memory to implement three main data constructs: a cell, a junction descriptor and a junction accessor. This junction manager function will be described herein as a preferred embodiment embedded in each object as sub-processes for implementing junction manager functions. However, a separate, linkable junction manager process, available to all other objects through the services of a computer operating system could be employed to the same effect.

A "cell" comprises one or many memory address spaces and holds the information or data describing one entry (state change) contained in a defined junction. Cells in a shared memory are accessed by junction manager sub-processes in (or available to) each object sequentially, first-in-first-out. Cells allocated to a junction in shared memory are "chained" by pointers in a singly-linked, logically contiguous list. Thus, each cell also contains a pointer to the next cell in the chain. The pointer in the last cell in the chain is NULL. Each cell also contains a reference count (refcount) that indicates the number of computer processes that have requested, but have not yet accessed (linked to), the cell. When the reference count reaches zero, the cell can be deallocated. Finally, a cell contains the actual data describing the state of the junction.

Figure 8:
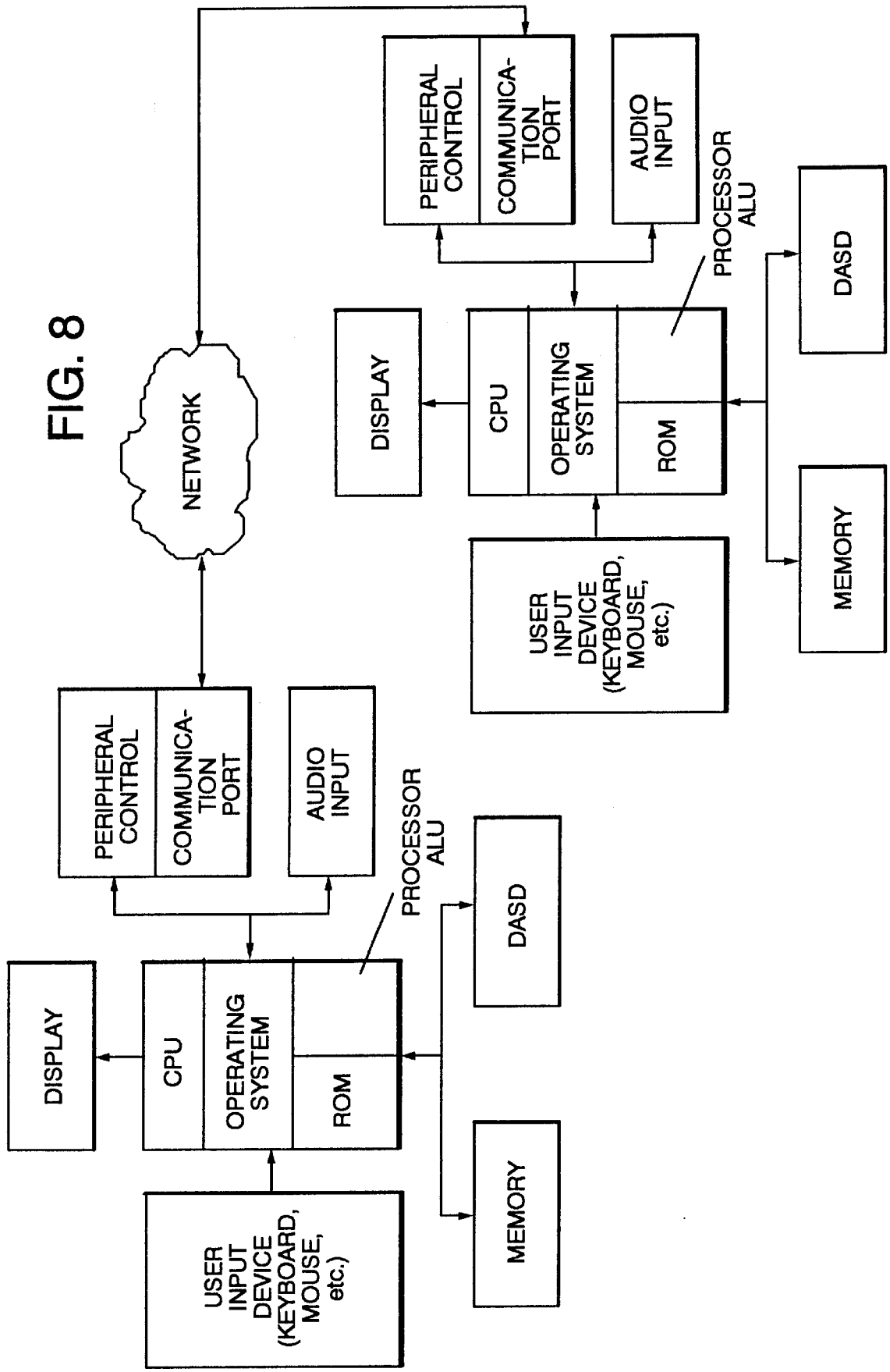
FIG. 8 illustrates several computer systems and computer memories linked in a LAN or communications network in which the invention may be employed in one or all of the computer memories, all of which may be shared by any of the computers in the system.

A "junction descriptor" structure in shared memory allows each object's junction manager to access the logically contiguous cells allocated to the junction. The junction descriptor contains a pointer to the first and last cell in the cell chain. It also contains semaphores used to control access to the junction's cells. (Use of the semaphores is described in greater detail below, but reference may be had to "An Introduction to Operating Systems" 2nd Ed., by H. M. Detel, Copyright Addison-Wesley, 1990, pp. 89–96, to see a full description of semaphores and their use in computer systems.) The junction descriptor also maintains a count of the number of processes currently accessing the junction. When a cell is created, its initial refcount is taken from the junction descriptor's active process count. Finally, in the preferred implementation, the junction descriptor contains the memory or storage used to hold its cells. (Note that the junction descriptor could, instead, store pointers to cells in memory on any computer accessible by the junction manager process, including memory in another computers system accessible over a communications network, LAN, or the like, as shown in FIG. 8, and still be viewed as "shared memory" in the context of its usage in this invention.)

An optional component of a junction descriptor is a list of pointers back to processes that may access the junction. Using this component, when a process is linked to a junction, a "back pointer" from the junction to the process is added to the process list in the junction description. Such a list can be used to recover from process failures, for example, by ensuring that semaphores continue to perform correctly in the presence of a process failure.

A junction manager's third major data structure in shared memory is a "junction accessor." Each time a process' junction manager subprocess links to a junction, it creates a new junction accessor. Thus, a process can own many separate multiple junction accessors, and multiple accessors can be linked to any junction. A junction accessor acts as an inquiring or storing process' link to a junction— that is, a junction accessor acts as a process' handle to a junction. Junction accessors can be stored either in shared memory or in a process' (object's) local memory.

A "junction" accessor 70 contains a pointer to a junction descriptor 60 and a pointer to the next cell 50 that the process owning (or using) the accessor process will access. When a process queries a junction's state, it uses its junction accessor's next cell pointer to access the next cell in the logically contiguous series of cells that it has not yet accessed and obtains the junction's next state value. Note that when a process first links to a junction, the resulting created junction accessor's next-cell pointer is set to the last (or last-occurring) element in the cell chain. Thus, a process cannot access a junction's state changes that occurred prior to the time that the process linked to the junction.

Figure 1:
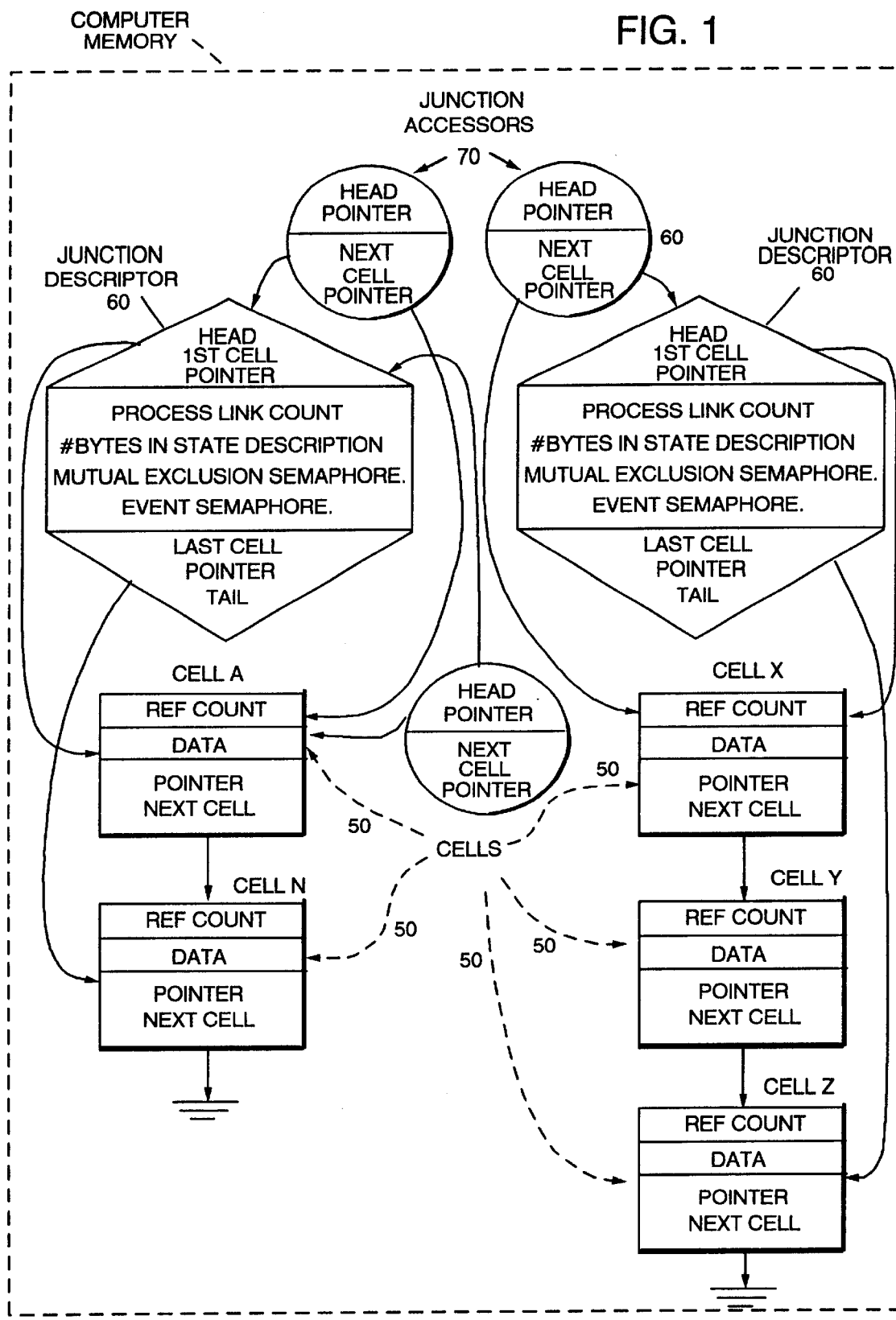
FIG. 1 illustrates schematically a preferred embodiment of the communication access and memory structure organization within computer memory of a preferred embodiment of the invention.

To demonstrate the interaction among the data structures, I will briefly describe the behavior of a process accessing a junction's state. (FIG. 1 illustrates the interaction.) I will assume that a junction J has been created, linked to by a process P and contains a current state. Furthermore, assume that P has not yet accessed at least one state of the junction. (I omit here discussion of semaphore use and other details of data-structure management and defer such discussion to the section describing in detail the junction manager's processes.) The process begins with a process P using its own junction accessor's (70) next-cell pointer to get a pointer to a cell C (50). Cell (50) C contains the junction's first state that has not yet been seen by P. Using the pointer to C, P decrements the C's refcount. Finally, P uses C's next cell pointer to update its own next-cell pointer in its junction accessor, 70. Thus, on the next state query, P will access C's successor in the chain of cells.

In summary, a logically contiguous chain of cells (50) is used to maintain the history of a junction's state changes. A junction descriptor (60) contains the status of the cell chain. A junction accessor (70) is a process's handle to the junction and the cell-chain for the junction.

Next, I provide a detailed description of the data layout for the structures comprising a junction manager according to the invention. Since the preferred implementation uses C-language code running on OS/2, I also provide example code fragments for OS/2 in C-language.

A Cell

In the preferred implementation, a cell 50 is a logically contiguous segment of computer memory or storage containing a pointer to the next cell in the junction, a "reference count" that indicates the number of processes that have linked to the cell, but have yet to access it, and data that describes the state of the junction. The order of presentation of a cell's contents is immaterial and any convenient arrangement of cell contents is permissible.

Schematically,

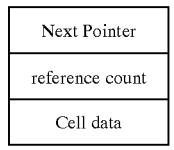

In C-language, this structure may be created as:

```
typedef struct Cell {
   struct CellHeader {
      struct Cell * NextP;
      USHORT     reference count; /* # of active users */
   } CellHeader;
   char        Data [1];
} Cell;
```

A Junction Descriptor

In the preferred implementation, a junction descriptor 60 is a logically contiguous segment of memory containing a count of the number of processes linked to the junction, the number of bytes in each state description, a mutual exclusion semaphore, an event semaphore, a pointer to the first cell in a logically contiguous series, a pointer to the last cell in a logically contiguous series, and a memory area from which cells are allocated.

Schematically, a junction descriptor 60 contents is as follows:

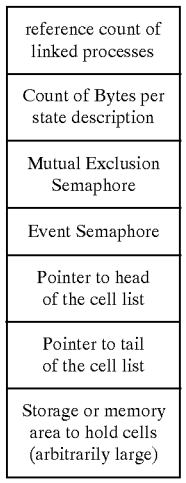

In C-language, an example code list to create a junction descriptor is:

```
typedef struct {
   struct JunctionHeader {
      USHORT   reference count; /* # of active users */
      ULONG    cellDataSize; /* Size needed to hold state */
      HMTX     MutexSem; /* Mutex sem for the junction */
```

-continued

```
      HEV      EventSem; /* Event sem for the junction */
      Cell     * HeadP; /* 1st Q'ed element */
      Cell     * TailP; /* last Q'ed element */
   } Junction Header;
   char        CellStorage[1]; /* "heap" to store cells */
} Junction;
```

A Junction Accessor

In the preferred implementation, a junction accessor 70 is a logically contiguous segment of memory containing a head pointer to the junction descriptor 60 of the junction being accessed, and a pointer to the next cell that the process owning the accessor will access. The "next" cell is the next cell in the logically contiguous series of cells which the process has not yet accessed for storage or reading of state data.

Schematically, a junction accessor example is:

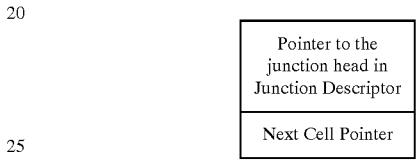

In C-language, an implementation for a junction accessor is:

```
PJunction   JunctionP; /* Pointer to the junction */
PCell       NextCellP; /* The next cell that this obj will examine */
```

Junction Manager Processes

The preferred implementation of the junction manager runs on the IBM OS/2 operating system, but similar C-language constructs or constructs in any other language appropriate to other operating systems may be easily created by one of skill in this art following the general design of these preferred embodiments.

Details of the junction manager's processes for inclusion in each object are presented below. Alternatively, a resident set of junction manager sub-processes could be installed in a computer system for access by, and use of, an object desiring to avail itself of the junction manager's services. In the preferred embodiment, however, each object is provided with its own sub-processes to operate as a junction manager; thus, the "junction manager" may be one object or many, and may be centrally located and accessible or distributed throughout a system of computers and memories linked via a communication network or LAN, as shown in FIG. 8.

Allocating a Junction

Figure 2:
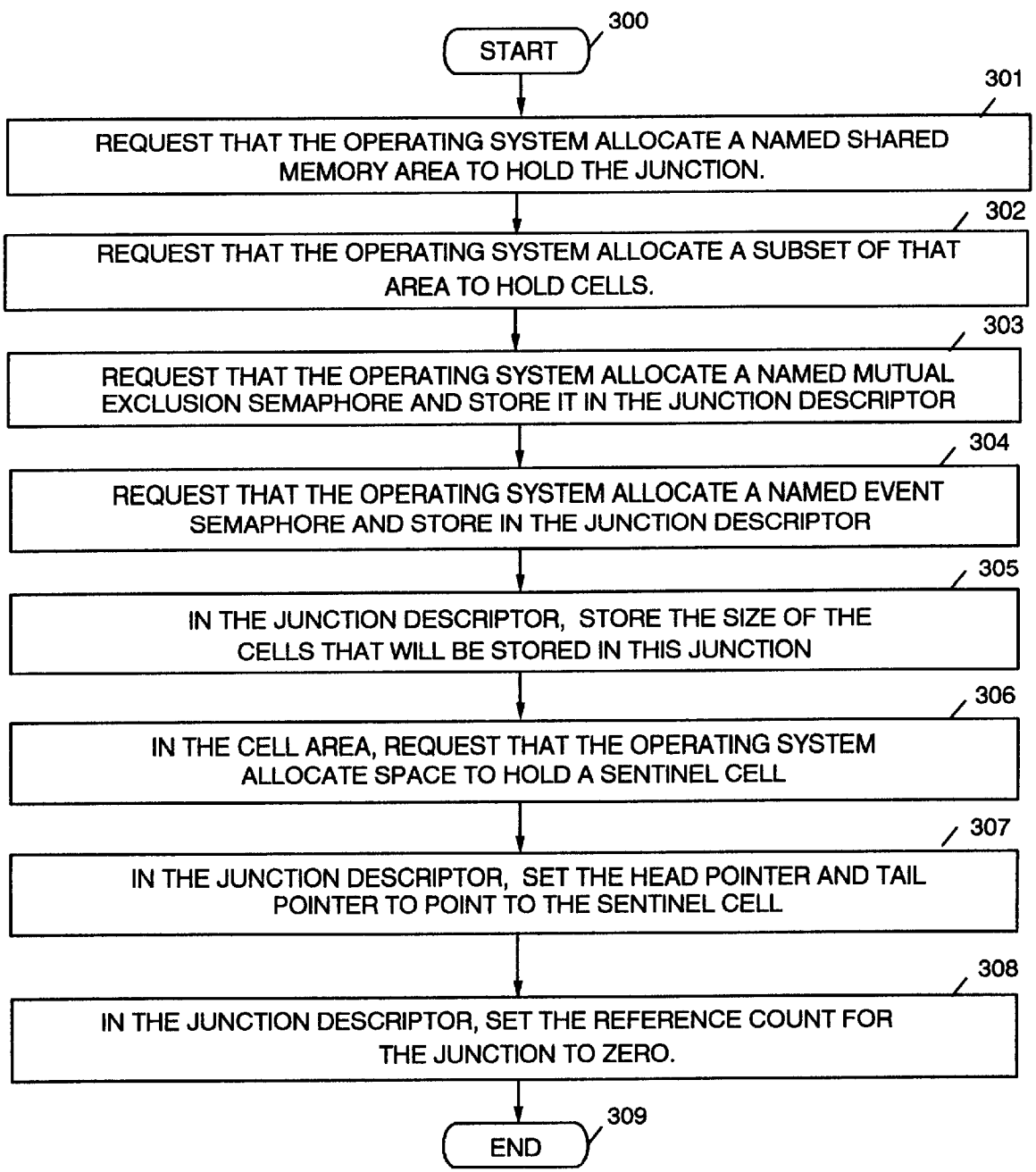
FIG. 2 illustrates a process step flowchart for a junction manager in, or accessible as a separate object to, each object to operate a shared memory embodiment for creating a junction by defining cells in shared memory.

The sub-process for any object to use or to implement and execute in allocating a junction and memory cells is described in connection with FIG. 2, where the reference numbers are to process steps as identified in FIG. 2. This sub-process, like all the others to be described, may be incorporated in any object desiring to link to a junction or may be a central service of the computer system made available through the operating system as a single object.

300. Start
301. allocate a named shared memory area to hold the junction descriptor.
302. allocate a subset of that memory area to hold cells.
303. allocate a named mutual exclusion semaphore and store it in the junction descriptor 304. allocate a named event semaphore and store it in the junction descriptor
305. In the junction's descriptor, store the size of the cells that will be stored in this junction
306. In the cell area, allocate a sentinel cell
307. In the junction descriptor, set the head pointer and tail pointer to point to the sentinel cell.
308. In the junction descriptor, set the reference count for the junction to zero.
309. End To allocate a junction descriptor to define a new junction, we first allocate a region of named shared memory (DosAllocSharedMem) to hold the junction descriptor (301). This is the junction descriptor. Out of this memory area, a subregion is carved (DosSubSetMem) that will hold the cells (302). Then, a mutual exclusion semaphore and an event semaphore (DosCreateMutexSem and DosCreateEventSem, respectively) are created (303 and 304). Out of the cell area, we allocate an initial sentinel cell (306). (All allocations from the cell storage area use DosSubAllocMem.) When a new state is added, it is copied into the current sentinel cell and a new sentinel cell is allocated. (This process is discussed in more detail below.) The process then sets the junction descriptor's head and tail pointers to point to the sentinel cell (307). This indicates that the junction has no current state. Finally, since no processes are linked to a newly allocated junction, the process sets the reference count for the junction to zero (308). Thus, when the junction is created, the reference count must be zero.

Figure 3:
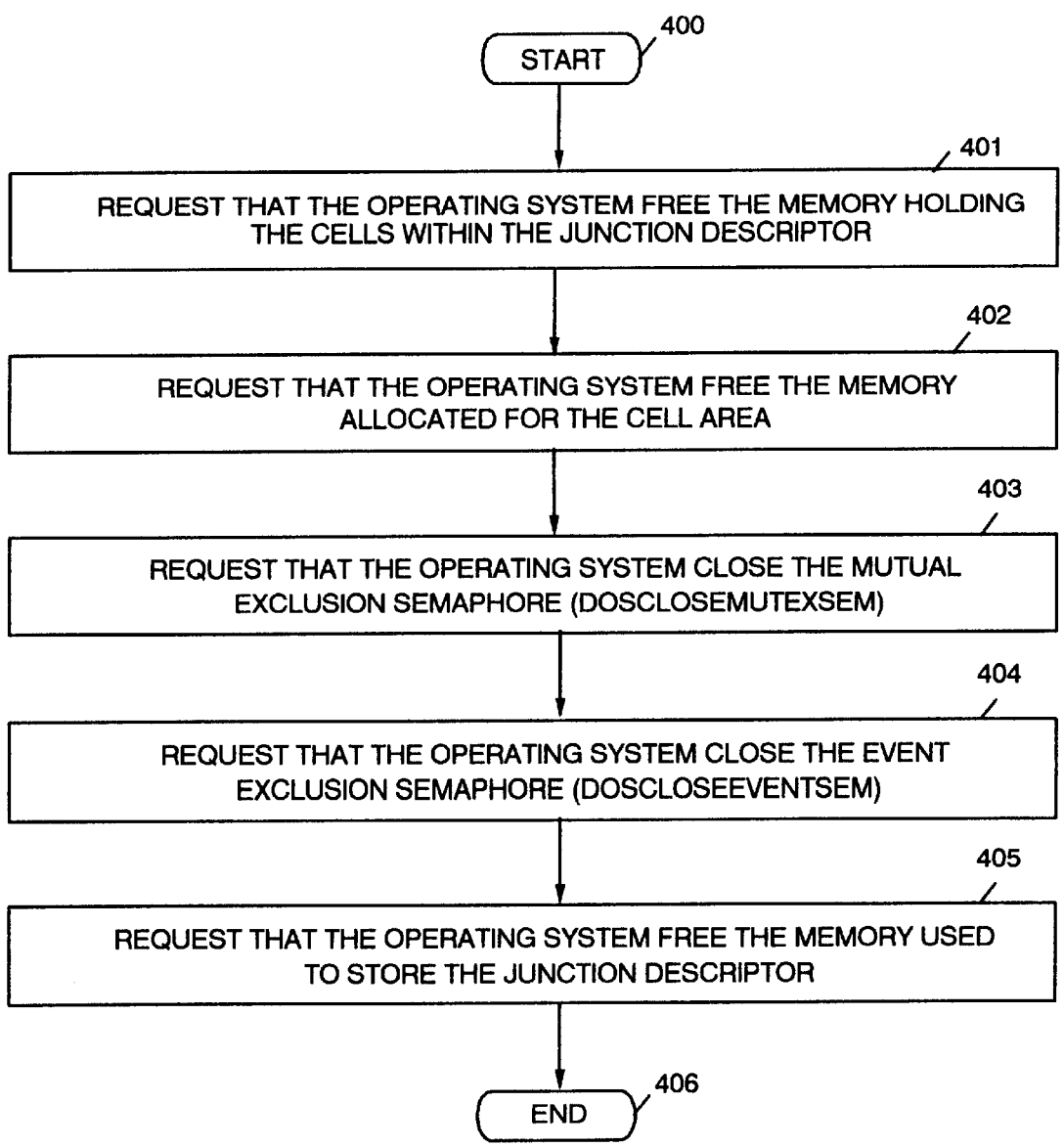
FIG. 3 illustrates the steps of a junction manager subprocess for eliminating or destroying a junction that was created in FIG. 2 as a portion of a preferred embodiment of the invention.

Destroying a Junction will now be described with reference to FIG. 3.
400. Start
401. Free the allocated cells within the junction descriptor
402. Release the memory allocated for the cell area
403. Close the mutual exclusion semaphore (DosCloseMutexSem)
404. Close the event exclusion semaphore (DosCloseEventSem)
405. Free the memory used to store the junction descriptor
406. End To destroy a junction, we must free the memory allocated when the junction was created we first free the cells allocated within the junction descriptor (401) and release the memory from which cells are allocated (402). We next close the mutual exclusion and event semaphores (403 and 404). Finally, we free the storage used to store the junction descriptor (405).

Linking to a Junction

Figure 4:
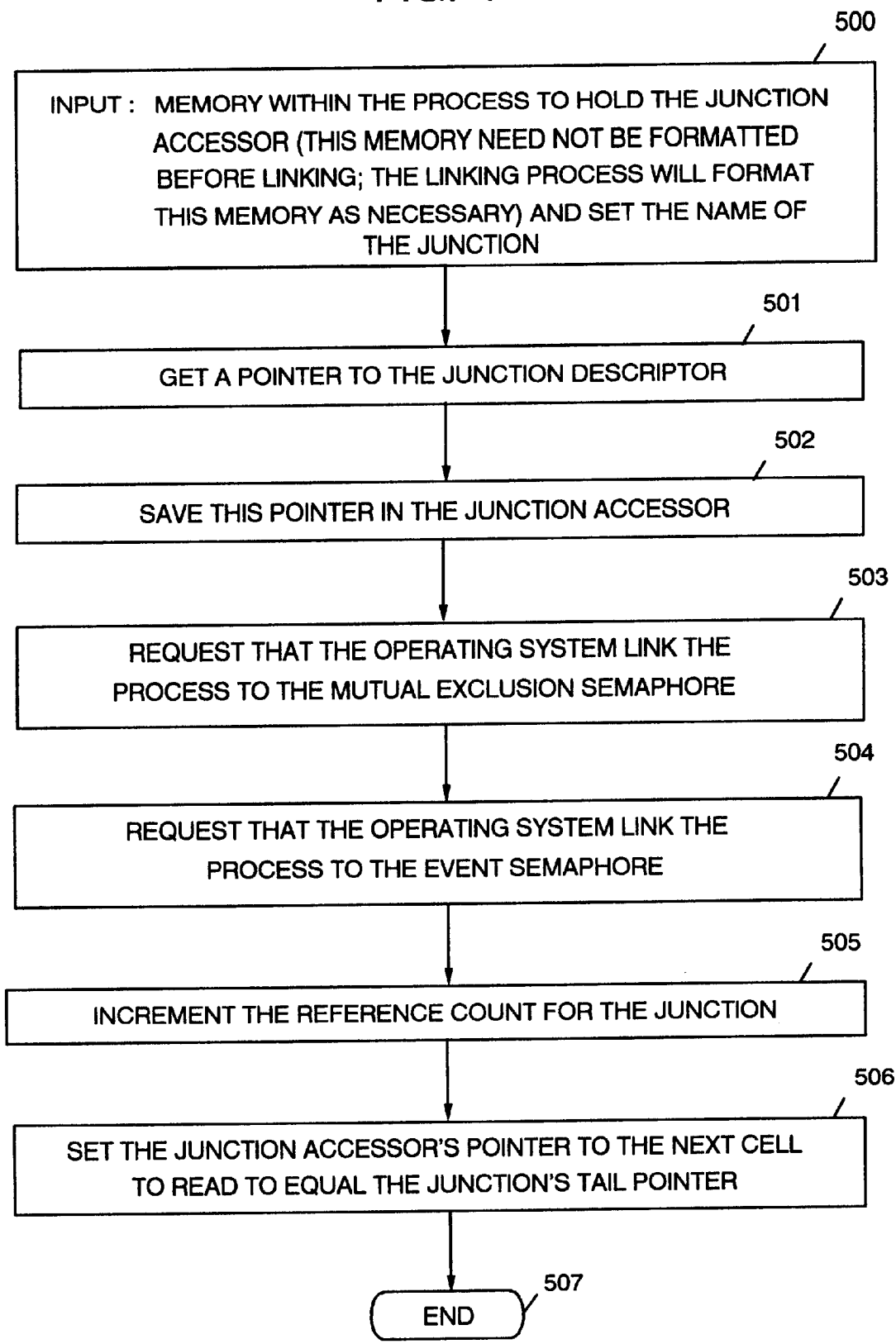
FIG. 4 illustrates the subprocess, in or accessible to, each object for linking to a junction, utilizing the preferred embodiment of the invention.

Linking to a Junction will now be described with reference to FIG. 4.
500. Input: allocate memory within the object or process to hold the junction accessor (this memory need not be formatted before linking; the linking process will format this memory as necessary). Input the name of the junction.
501. Get a pointer to the junction's descriptor.
502. Save this pointer in the junction accessor for the process to be linked to the junction.
503. Link the process to the mutual exclusion semaphore by writing the pointer to the semaphore in the process' junction accessor.
504. Link the process to the event semaphore by writing the pointer to the semaphore in the process'junction.
505. Increment the reference count of linked processes for the junction.
506. Set the junction accessor's cell pointer to the next cell to be read to equal the junction's tail pointer.
507. End Linking to a junction by an object means taking steps at the object for creating and initializing a junction accessor. Given an area of memory established in the linking process to hold the junction accessor and the name of the junction, we first get a pointer to the junction descriptor (DosGetNamedSharedMem) and store it in the junction accessor (501 and 502). Next, we link to the mutual exclusion semaphore (DosOpenMutexSem) and to the event semaphore (DosOpenEventSem) (503 and 504) by copying into the accessor's memory space the pointers to the memory address location where these semaphores exist. Since one more process (this one) is now linked to the junction, we increment the junction descriptor's link reference count (505). Recalling that we obtained a pointer to the junction descriptor in step 501, we set the junction accessor's next cell pointer to the junction's tail pointer—that is, to the current value of the junction. This prevents the newly linked process from accessing states that existed before the linking occurred.

Figure 5:
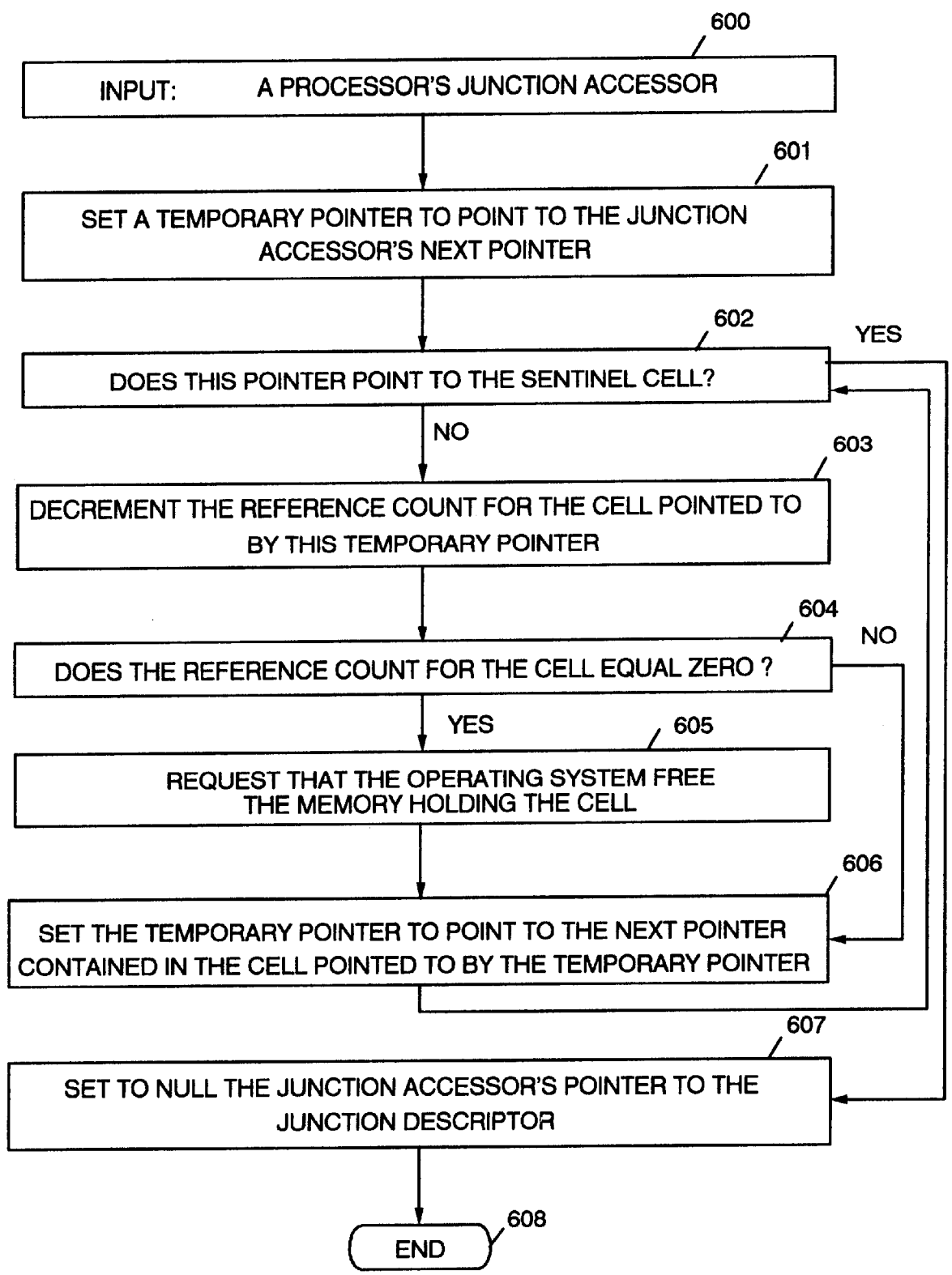
FIG. 5 illustrates the inverse process steps for unlinking a junction utilizing the preferred junction manager process located either in each object instance of the invention, or in a separate object accessible by the requesting object.

Unlinking a junction will now be described with reference to FIG. 5.
600. Input: an object's junction accessor
601. Set a temporary pointer to point to the junction accessor's next pointer
602. If this pointer points to the sentinel cell, go to step 607.
603. Decrement the reference count for the cell pointed to by this temporary pointer
604. If the reference count for the cell does not equal zero, go to step 606
605. Deallocate the cell.
606. Set the temporary pointer to point to the next pointer contained in the cell pointed to by the temporary pointer; go to step 602.
607. Set to NULL the junction accessor's pointer to the junction descriptor.
608. End Unlinking a process from a cell reverses the linking process. First, we unlink the process from the cells that it has not (and now will not) access we do this by creating a temporary pointer that points to the first cell not already accessed by the process —that is, to the cell pointed to by the junction accessor's next pointer (601). If this pointer points to the sentinel cell, the process has examined or unlinked each cell in the junction, so we go to step 607 (602). If this pointer does not point to the sentinel cell, we decrement the reference count for the cell pointed to by the temporary pointer (603). If the ref count is not zero, other processes may still access the cell, so we go to'step 606. Otherwise, the reference count is zero—thus the cell will never again be accessed—so we deallocate it (605). We next advance the temporary pointer to point to the next cell in the junction's list and return to step 602. Finally, once all of the cells have been unlinked, we set the junction accessor's pointer to the junction to be NULL (607). Thus, the process cannot reaccess the junction without again linking to it.

Setting a Junction's State

Figure 6A:
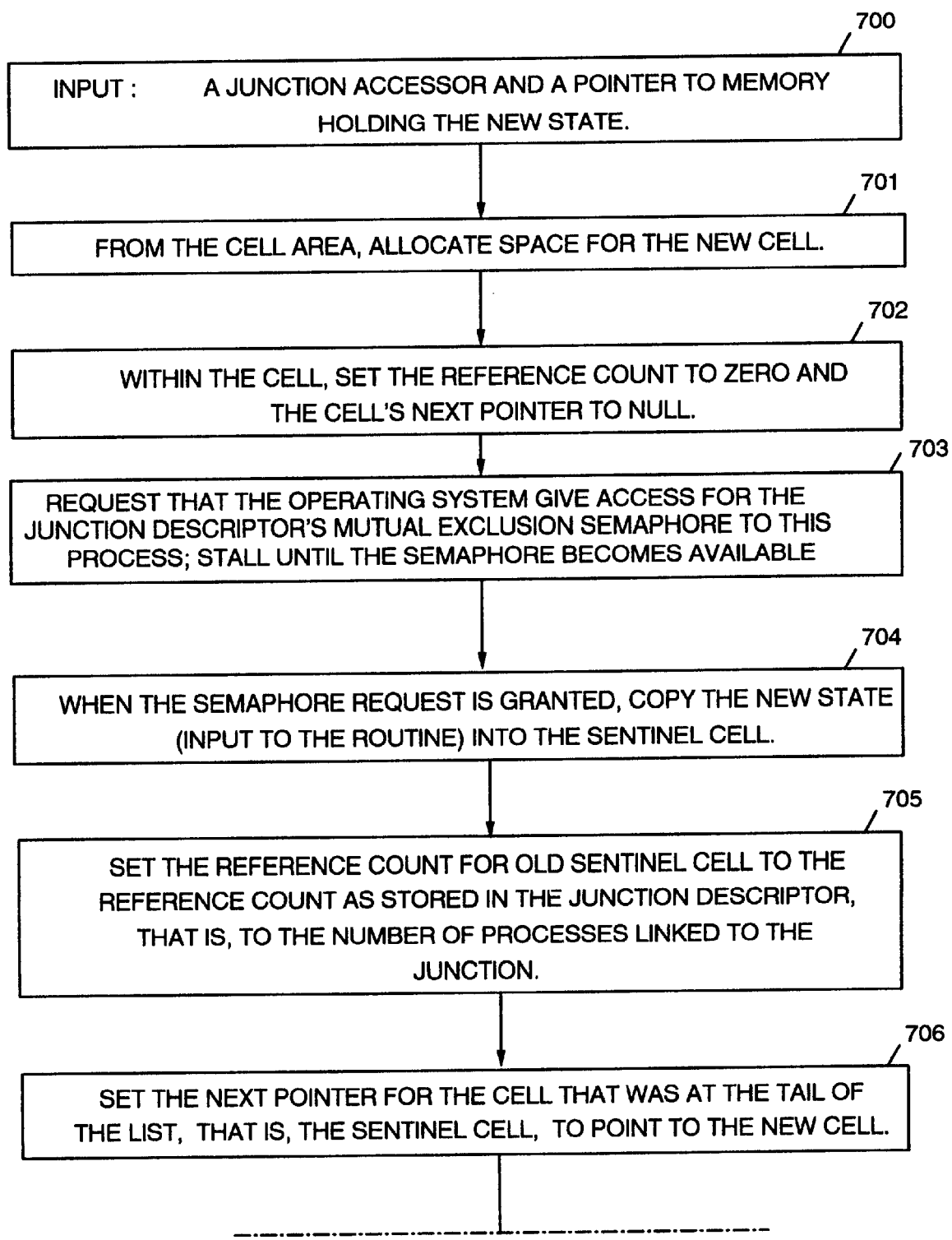
FIG. 6, comprising FIGS. 6A and 6B as shown, illustrates the process in or useable by each object in the preferred invention for setting the state of a junction.
Figure 6B:
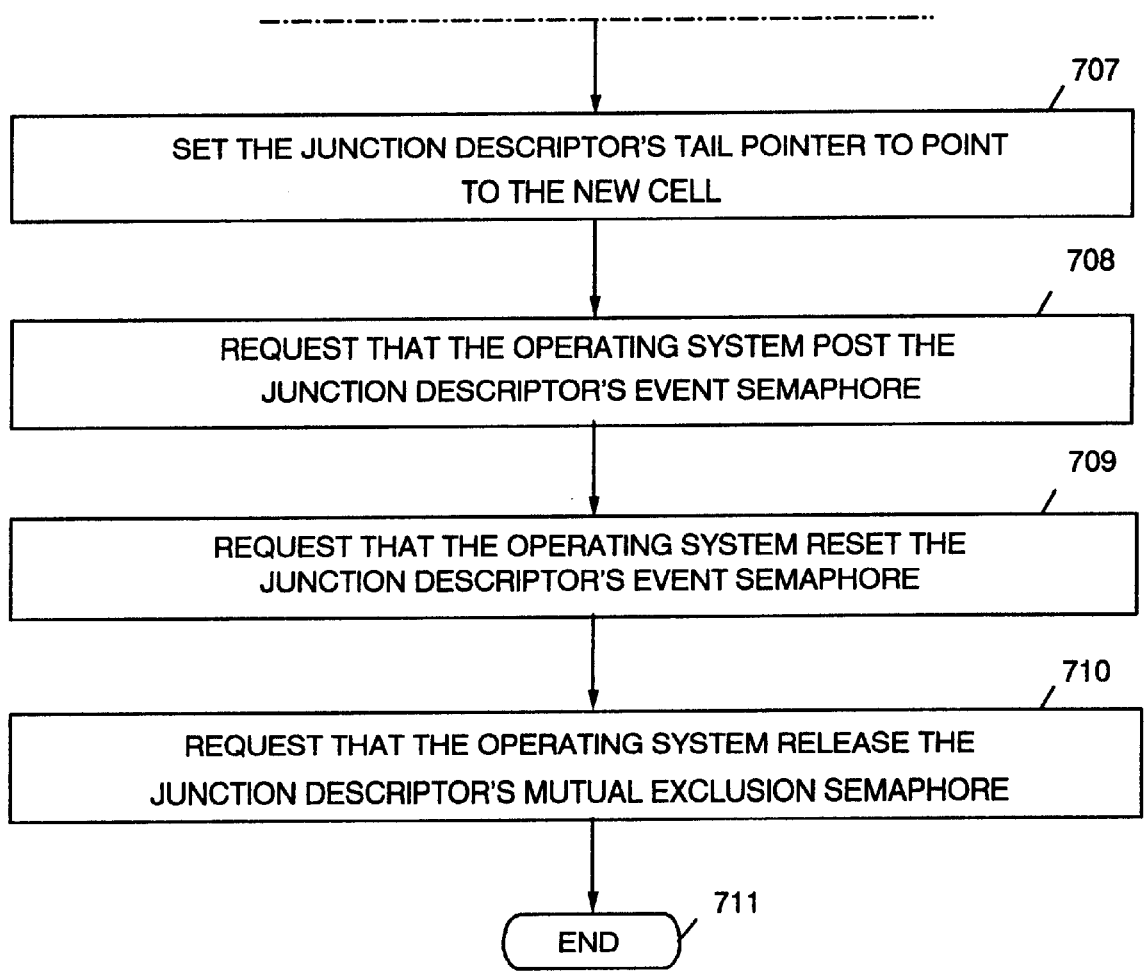
Figure 6:
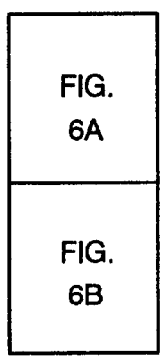

Setting a State for the Junction will now be described with reference to FIG. 6.
700. Input: A junction accessor and a pointer, which is a memory address to the memory area for holding the new state.
701. From the cell area, allocate space for the new cell
702. Within the cell, set the reference count to zero and the cell's next pointer to NULL.
703. Request the junction descriptor's mutual exclusion semaphore; block until the semaphore becomes available 704. When the semaphore request is granted, copy the new state (input to the routine) into the sentinel cell.
705. Set the reference count for the old sentinel cell to the reference count as stored in the junction descriptor—that is, to the number of processes linked to the junction.
706. Set the next pointer for the cell that was at the tail of the list—that is, the sentinel cell—to point to the new cell.
707. Set the junction descriptor's tail pointer to point to the memory address of the new cell.
708. Post the junction descriptor's event semaphore to indicate a change of state.
709. Reset the junction descriptor's event semaphore.
710. Release the junction descriptor's mutual exclusion semaphore
711. End When a process sets the next state stored in a junction, it accesses the junction by using the pointer to the junction stored in its junction accessor (created when the process itself links to the junction) (700). Within the junction's cell area, the process allocates a new cell (701). This new cell will act as the new sentinel cell. The process then sets the reference count for the cell to zero (702).

Next, the process requests the mutual exclusion semaphore and blocks (that is, waits) until the request is granted (703). Once the request is granted, it copies the new state into the old sentinel cell (704) and sets the reference count for the old sentinel cell to the value stored in the junction descriptor's reference count (705). This sets the reference count for the cell to be the number of processes currently linked to the junction. The process then sets the next pointer for the cell that was at the tail of the list, that is, the sentinel cell, to point to the new cell. This inserts the new cell's memory address at the end of the junction descriptor's list of cells, and hence makes it the new sentinel cell (706). The process then sets the junction descriptor's tail pointer to point to the new cell (707), telling the junction that this new cell is now the sentinel cell.

Next, the process posts (writes to an area of memory) the event semaphore (708). This frees all processes blocked waiting for a new value of the junction—that is, any process that had read all of the junction's states, and had asked to read the next (non-existent) state. It then resets the junction descriptor's event semaphore (709). Once the semaphore posting has occurred, the semaphore must be reset to prevent any processes from later trying to read non-existent states (710). Finally, the process releases the junction descriptor's mutual exclusion semaphore (711).

Querying a Junction's State

Figure 7A:
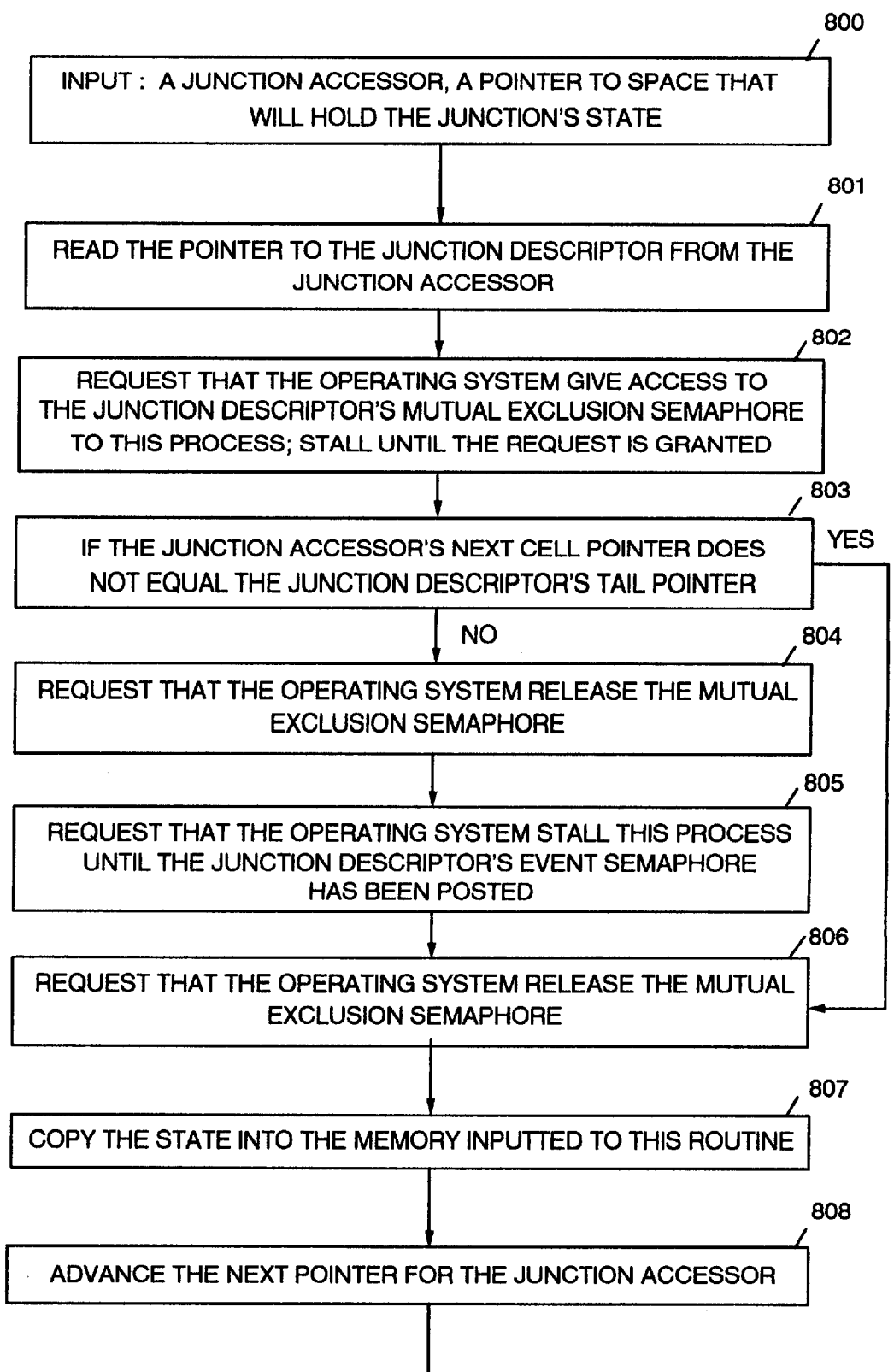
FIG. 7, comprising FIGS. 7A and 7B as shown, illustrates the process for use by each object in the preferred embodiment of the invention for querying the junction's next state.
Figure 7B:
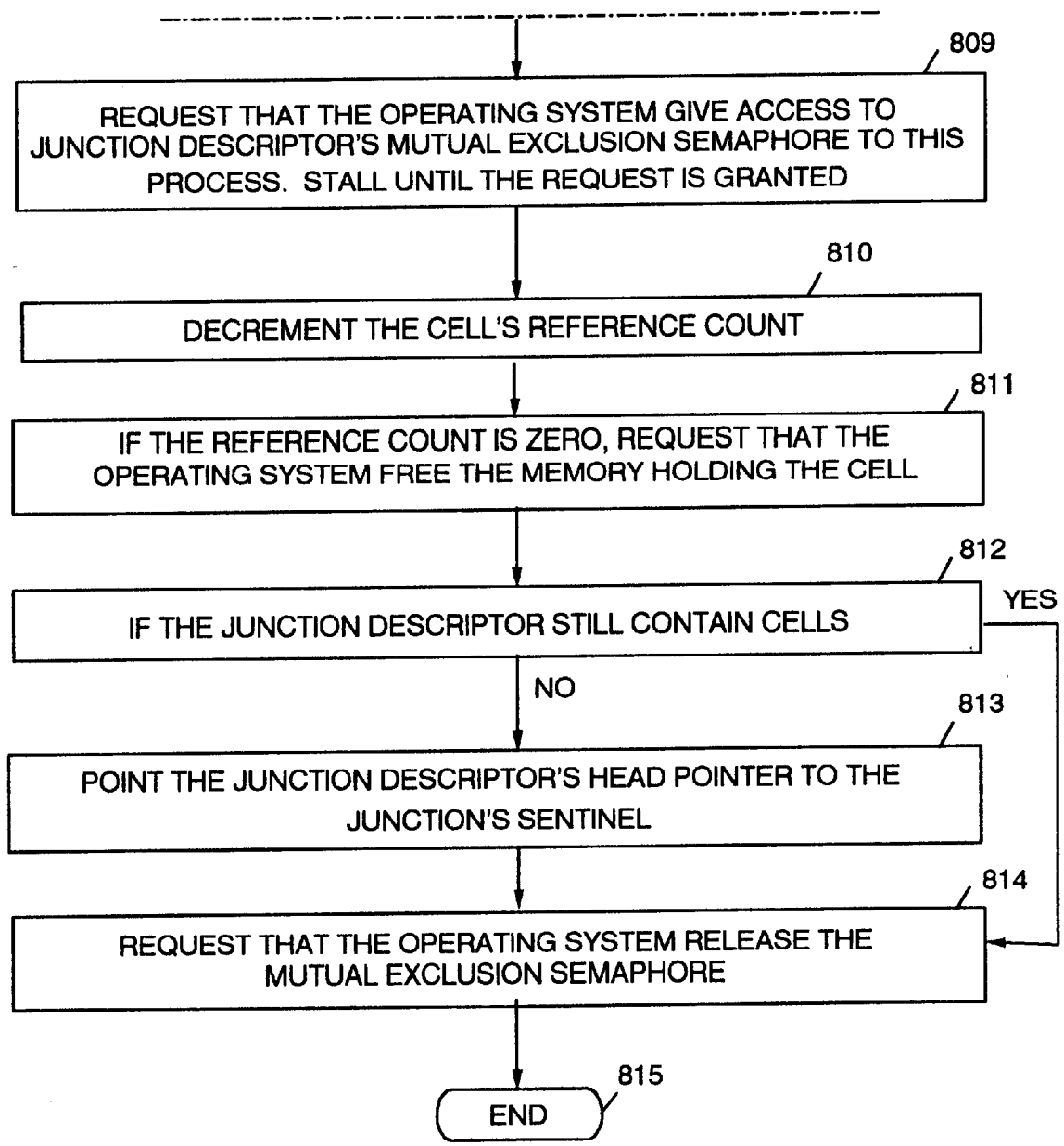
Figure 7:
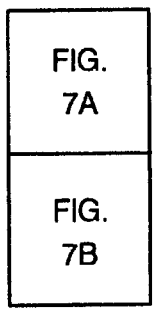

Getting the Junction's Next State will now be described with reference to FIG. 7.

800. Input: a junction accessor, and a pointer to memory space that will hold the junction's state.
801. Read the pointer to the junction descriptor from the junction accessor
802. Request the junction descriptor's mutual exclusion semaphore; block until the request is granted.
803. If the junction accessor's next cell pointer does not equal the junction descriptor's tail pointer, go to step 806
804. Release the mutual exclusion semaphore
805. Block on the junction descriptor's event semaphore; go to 807
806. Release the mutual exclusion semaphore
807. Copy the state into the memory inputted to this state requesting process.
808. Advance the next pointer for the junction accessor.
809. Request the junction descriptor's mutual exclusion semaphore. Block until the request is granted.
810. Decrement the cell's reference count.
811. If the reference count is zero, free the cell.
812. If the junction descriptor still contains cells (i.e., the reference count is not zero, so there are cells not yet accessed by the querying process), go to 814.
813. Point the junction descriptor's head pointer to the junction's sentinel cell.
814. Release the mutual exclusion semaphore.
815. End.

To get a junction's first state not previously read by a process, the process first gets a memory address pointer to the area in memory holding the junction from the process'junction accessor (801). It next requests the junction's mutual exclusion semaphore, and blocks until the request is granted (802). Once the semaphore request has been granted, if the junction accessor's tail pointer does not equal the junction descriptor's tail pointer, that is, it does not point to the sentinel cell, there are states in the junction that the process has not read, so the process continues to step 806 at step (803).

Otherwise, the process has read all states currently in the junction. If that is true, the process releases the mutual exclusion semaphore (804) allowing other processes to access the junction. It then stalls until the junction's event semaphore is posted; when the process is restarted (when a process adding a new state posts the event semaphore, as described above in step 708) it goes to step 807 at step (805).

Step 806 is executed only if the process did not block on the event semaphore and had not released the mutual exclusion semaphore. This step releases the mutual exclusion semaphore (806).

At this point, the process is guaranteed to be ready to access a valid state (either because it had not previously accessed all of the states, or because a new state was added and the event semaphore posted). The process copies the current state out of the cell pointed to by the next pointer in its junction accessor (807). It then advances that pointer (808). The process then requests the junction descriptor's mutual exclusion semaphore, and, when the request is granted, decrements the reference count for the cell that was read (809 and 810). This indicates that one fewer process has yet to access the cell.

If the cell's reference count is now zero, no other processes will access the cell, so the process frees the cell (811). If the junction still contains cells, we needn't adjust the junction descriptor's head pointer, so we go to step 814 (812). If the junction no longer contains any cells (because this process freed the last one), the process sets the head pointer to point to the sentinel cell (813). This indicates that the junction is now empty.

Finally, the process frees the mutual exclusion semaphore (814).

Attributes of Junction Managing Process

The junction managing process is characterized by two distinguishing features: (1) it does not require a separate active entity to manage the junctions and (2) processes using junction access only information created after they link to the junction.

The first feature distinguishes this process from object request brokers (ORBs). Using an ORB, for one object (O1) to communicate with another object (O2), O1 must communicate with the ORB to obtain information about O2 before communicating with O2 itself. This requires that an active ORB exists, adding complexity to the system, and that O1 communicate with it, adding overhead.

The second feature, a temporal restriction on information access, distinguishes this process from shared memory systems such as the Linda programming language. In shared memory systems (a.k.a. blackboard systems), one object can post a "note" that one or more other processes can access. The note exists until some object removes it. Thus, a note can be used to connect processes whose lifetimes do not overlap.

The junction managing process differs in that viewing objects are restricted to viewing only data added to the junction after the object linked to the junction. Thus, an object needn't worry about sifting through residual data left in the junction before linking occurred.

This process is especially suitable for building event-driven software systems. For example, imagine that a computer-keyboard manager (typically a "device driver") used the junction managing process. The keyboard manager could create a junction called "keyboard_input," link to it, and then deposit each keystroke to the junction as a new change of state. Any object interested in the keyboard input could then link to the "keyboard_input" junction and read the keystrokes as they were added.

Figure 9:
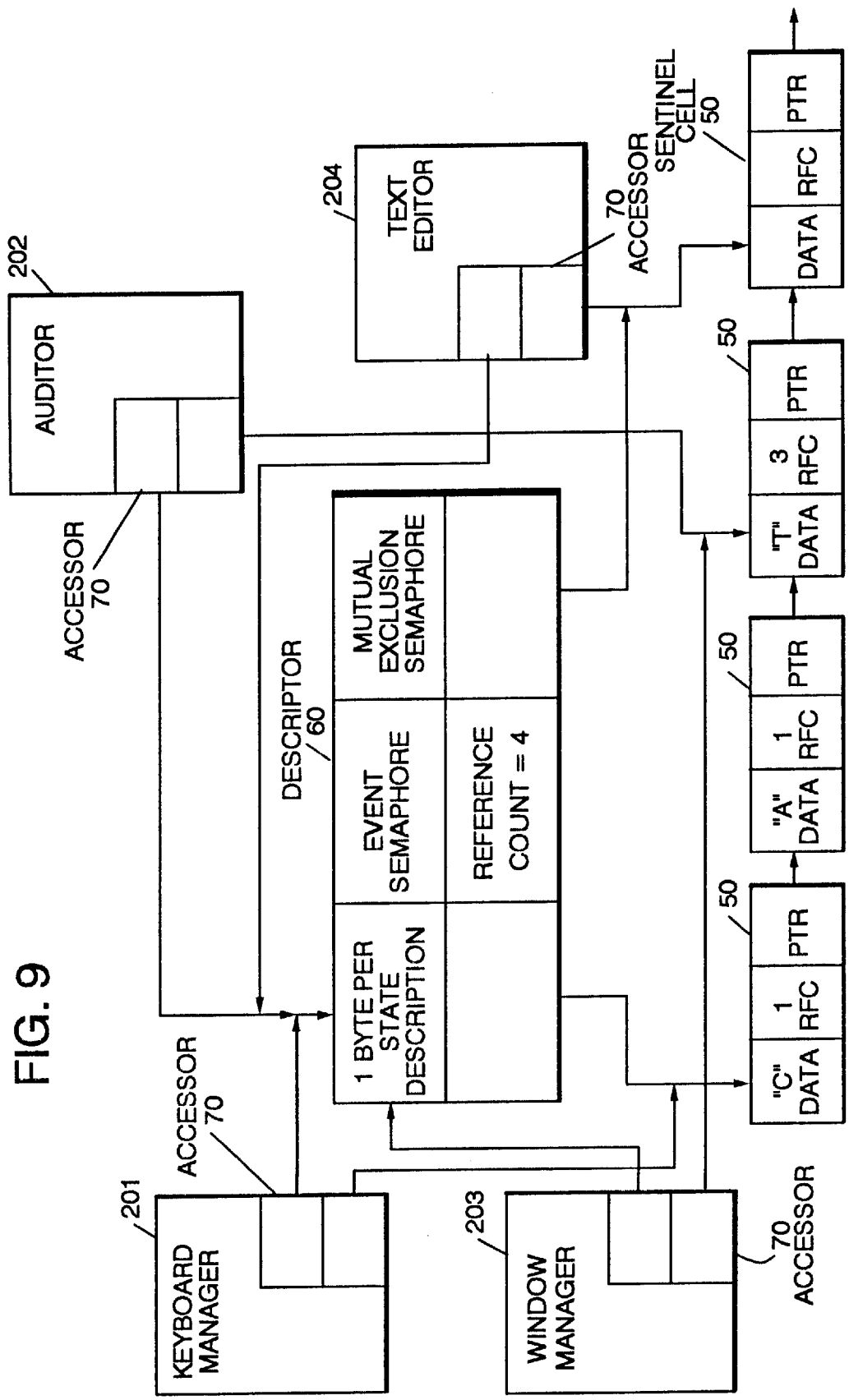
FIG. 9 illustrates schematically how several application programs running in a computer system on one or more processors may use the Junction Manager of the invention to facilitate data communications and sharing of state (data) information using shared memory, or memory accessible by all of the applications, to asynchronously manage storing, updating, accessing, reading of data to be used by all of the applications.

Extending our example, imagine that a windowing system 203 (e.g., Presentation Manager), a text-editor 204 (e.g., Microsoft Word) and an auditing system 202 all linked to and read from the "keyboard_input" junction. FIG. 9 illustrates such an embodiment. Each of these program objects can "see" the result of the keystrokes simultaneously. Each of the program objects can then operate on the keystroke asynchronously—that is, without concern for how other objects are using the keystroke.

Using existing technology, the keyboard manager 201 will read the keystroke, and pass it to the windowing system 203, which would pass it to the word processor 204 and the auditor 202. Thus, the keystroke must pass through an intermediate level—the windowing system—before reaching the other processes. Further, the windowing system passes the strokes to its client sequentially. This reduces the opportunity for parallel execution on a multiprocessor workstation since the interested program objects must wait to receive each keystroke. (Note that multiprocessor workstations will become increasingly prevalent in the next decade.) In addition, any other objects interested in the keystrokes must also link to the keyboard manager, increasing complexity.

To ground the example further, we'll show how the sub-processes comprising the junction manager of the invention will operate in this example of an application of the invention.

To start, the keyboard manager 201 would create a junction Descriptor 60, calling it "keyboard_input." To create the junction, the keyboard manager would execute steps 300–308. These steps will create a junction descriptor for the new junction. In the junction descriptor, this process will allocate a mutual exclusion semaphore and an event semaphore (steps 303 and 304). The junction descriptor will also contain the size of the entries to be contained by the junction (step 305), in this case, one byte (for 1 keystroke). Since the junction is initially empty, that is, it contains no keystrokes, the head and the tail pointers both point to the sentinel cell. Also, since no processes are linked to the junction, the reference count is zero.

Next, to be able to add keystrokes to the junction, the keyboard manager 201 would link to it, executing steps 500–507. First, the keyboard manager 201 would set aside local memory to hold the junction accessor 70. Next, it uses the name of the junction (in this case, "keyboard_input"), and the OS/2 GetNamedSharedMem call to get a pointer to the junction. The keyboard manager 201 then places this pointer in its junction accessor 70. The process then requests that the operating system give it access to the junction descriptor's semaphores using the OS/2 calls, DosOpenMutexSem and DosOpenEventSem. The names of the semaphores will be the same as the name of the junction, prepended with a constant string. The keyboard manager 201 then increments the junction descriptor's reference count to 1, since one process is now linked to the junction. Finally, the keyboard manager 201 sets its junction accessor's read pointer to the junction descriptor's 60 last pointer, which, since no cells have been added, still points to the sentinel cell.

The keyboard manager 201 can then add cells to the junction using steps 700–710. To add a new cell, the process actually adds state data to the current sentinel cell, and then allocates a new sentinel cell. This ensures that when stalled processes wake-up, they will point to the correct cell. (This is true since stalled processes always point to the last cell, that is, the sentinel cell. Since the sentinel cell now contains the new state, the stalled process will point to the new state.) So, from within the junction descriptor 60, the keyboard manager 201 would allocate a new cell, and set its reference count to zero and next pointer to NULL. Next, it requests that the operating system give it exclusive use of the mutual exclusion semaphore (704). This ensures that while the keyboard manager 201 is manipulating the list of cells, no other process simultaneously manipulates the list. In other words, the mutual exclusion semaphore, throughout the junction manager process, ensures that only one process at a time can manipulate any given junction's cell list.

Next, the keyboard manager 201 transforms the old sentinel cell into an active cell by setting the reference count for the cell, copying the keystroke into the data field of the cell, and linking in the new sentinel cell. The reference count for the cell becomes the number of processes linked to the junction (as stored in the junction descriptor). This indicates that every linked process might access the cell, but, as yet, none have done so.

The keyboard manager 201 then informs any processes (such as Auditor 202 and window manager 203) waiting for a new state, that a new state is actually present. When a process requests to read a junction's state, but all of the cells have been read, the junction managing process suspends the requesting process. It does this by requesting that the operating system stall the requesting process until a given "event semaphore" (stored in the junction descriptor) is "posted." Thus, when the keyboard manager adds a new cell (keystroke), it must restart stalled processes. The keyboard manager does this by "posting" an event semaphore, thereby requesting that the operating system restart the stalled processes. The keyboard manager 201 then resets the event semaphore, which allows other processes to stall waiting for it to be posted.

Since the keyboard manager has completed its manipulation of the junction's list of cells, the keyboard manager 201 an release the mutual exclusion semaphore.

Furthering our example, consider a window manager 203 reading the keystrokes in the junction by executing steps 800–815. First assume that the window manager had linked to the junction using the processes described above, and thus has created a valid junction accessor in its local memory.

The window manager 203 first gets the pointer to the junction descriptor 60 from its junction accessor 70, then requests the mutual exclusion semaphore, blocking (stalling) until the operating system grants the request. Recall that use of the mutual exclusion semaphore when manipulating the list of cells ensures that only one process at a time can access the list, and thus that the list is not corrupted.

Once the semaphore request has been granted, the window manager 203 checks to see if it has read all of the junction's cells. All of the cells have been read if the window manager's junction accessor's next read pointer points to the sentinel cell (that is, points to the same location pointed to by the junction descriptor's tail pointer). If all of the cells have been read, the window manager releases the mutual exclusion semaphore (allowing other processes to work with the junction), and then requests that the operating system stall the window manager (using the event semaphore stored in the junction descriptor). The operating system will restart the window manager when a new cell is added, and the event semaphore is "posted" (as described above).

At this point, the window manager 203 knows that there is a cell in the junction that it has not read. It copies the keystroke stored in the cell pointed to by its junction accessor's next read cell pointer. At that point, it has read the junction's state.

It then advances its next read cell pointer using the next pointer in the cell it read. It then requests the mutual exclusion semaphore in the junction descriptor 60, and, once the request is granted, it decrements the cell's reference count. (The count is decremented since one fewer process is left to read the cell.) If the reference count dropped to zero, no further processes can read it, and the window manager deallocates the memory holding the cell, and adjusts the junction descriptor's head pointer.

Finally, the window manager 203 adjusts the junction descriptor's head pointer such that it points to the first cell in the junction, and releases the mutual exclusion semaphore.

To read more of the junction's cells (keystroke), the window manager 203 and text editor or word processor 204 repeats the process beginning with step 800. The Auditor program, 202, operates in similar fashion to the window manager to access and read the keystroke data stored in the state cells, 50 by the keyboard manager 201.

In FIG. 9, the keyboard manager 201 has deposited (stored) three characters, C, A, T, in three cells 50 in memory that can be accessed by all of the programs 201, 202, 203, 204 in the example. As illustrated in FIG. 9, keyboard manager 201 has not read the contents of any of the cells, 50. However, the window manager 203 and the Auditor program 202 have each read two cells ("C" and "A" characters). Thus, the new refcount for the cells holding C and A is "1", while the refcount for the cell holding the "T" is "3". The refcount in junction descriptor 60 is 4, however, because 4 programs may access the cells' contents in shared memory.

This example points to the importance of the junction managing process's temporal restriction: objects interested in keyboard input—in fact, any user interaction with the system—are not interested in what was entered last week; they are interested in what is entered while the object exists. Forcing such objects to scan irrelevant data posted to a bulletin board only adds complexity.

This point can be generalized to the following: event-driven systems are typically constructed such that objects comprising the system are only interested in events occurring after the object is created. The junction managing process is well-suited to the construction of such systems.

Benefits of Shared Memory Junction Manager

In this invention, I have illustrated how to implement a preferred embodiment of the junction manager in shared memory. This implementation provides a number of benefits:

State propagation is more efficient since it only requires simple manipulation of shared memory by each processor (or object) when such a process desires the state information. This eliminates the need for multiple interprocess communication events as required by COI.

Junctions are unbounded: neither the number of junctions extant in the system nor the number of processes accessing these junctions is limited, except by the logical size of the shared memory allocated in implementing the junction manager.

Junctions are dynamic: processes can bind dynamically to existing junctions and junctions can-be created dynamically. This is not the case using COI.

Junctions are independent of process lifetime. As a result of using shared memory, the history of state changes can be preserved even when no processes are attached to the junction or even when processes no longer exist in the system.

Access to the junction manager function does not require a specific application programmer's interface (API). Instead, any process implementing the junction manager need only know the architected formats used to access the shared memory used. Thus, the junction manager is "open."

Communication through the junction manager processes is "anonymous:" a process querying the junction's state need not know the name of the process that set its state, and a process setting the state need not know the name of any process that will later read the junction's state.

The junction manager is passive: it does not require the creation of a separate process (or thread) to manage the junction changes. Rather, the function of the junction manager is embedded in the protocol used by each object or process to access the shared memory. This saves system resources.

The junction manager encompasses the function of an Object Request Broker (ORB) without the overhead typically associated with an ORB (discussed below). One use of the junction manager is as a high-performance ORB.

Relationship to Object Request Brokers

Conceptually, the junction manager is somewhat similar to Object Request Brokers (ORBs). Both enable interobject communication. However, the junction manager greatly reduces the communication overhead.

For one object (O1) to communicate to another (O2) using an ORB, the O1 must send a message to the ORB which then forwards it to O2. If O1's initial message contained a "return address", O2 can then send directly to O1, bypassing the ORB. Furthermore, if O2's first message to O1 contains a return address, O1 can then bypass the ORB when communicating with O2.

The drawback to this process is that all communication occurs through messages (or through an RPC layer built on messages). Thus, if the message must be propagated to N objects, N−1 message sends must be performed. Those sends are in addition to the initial interaction with the ORB.

The junction manager eliminates virtually all of that communication overhead. For one process to communicate with an arbitrary number of other processes, it merely sets the state of a junction within the shared memory. As described above, processes access the junction data through their own junction accessor created when a process links to the junction. Using its own junction accessor (as shown in FIG. 1), a process can bypass an ORB. No messages are passed. Processes interested in the state of a junction simply read it from the shared memory managed by their own junction manager; again, no messages are passed. However, if the junction manager is implemented using distributed, logically-shared memory rather than physically-shared memory, the memory management software might pass messages. However, this message passing would be shielded from the application layer. Furthermore, since such message passing is implemented at a lower software layer, typically the operating system layer, it will typically be far faster than application-layer message passing. Furthermore, since the ORB is not needed, the system will be less complex. Thus, the junction manager is, in essence, an optimal ORB, in that the junction manager provides the ORB's function without the ORB's overhead.

What is claimed is:

1. An inter-object communication process comprising steps executable in a computer processor having access to a computer memory, for:
   a. creating in said memory a junction descriptor data structure having indicators for the location in said memory of the first and last of a logically contiguous series of memory storage locations where the sequential history of junction state data is stored, and a count of the number of objects currently having access to said junction state data; and
   b. creating in said memory a junction accessor data structure for use by an object desiring to access said junction state data, said accessor data structure having indicators for said first of said logically contiguous memory storage locations of said junction descriptor data structure and for the next of said logically contiguous memory storage locations to be accessed by said object.

2. An inter-object communication process as claimed in claim 1, wherein:
   said creating of said junction descriptor data structure includes a step of creating in said junction descriptor data structure a mutual exclusion semaphore indicator.

3. An inter-object communication process as claimed in claim 2, wherein:
   said creating of said junction descriptor data structure includes a step of creating in said junction descriptor data structure an indicator for an event semaphore.

4. An inter-object communication process as claimed in any one of claims 1 through 3, further including a step of:
   creating in said memory an allocation of memory space for holding an indicator for the location in said memory of a sentinel cell indicating the end of said junction descriptor data structure.

5. A program object to program object communication system comprising at least two program objects, a computer system having at least one processor and memory accessible by said at least two program objects and further comprising:
   means for creating in said memory a junction descriptor data structure having indicators for the location in said memory of the first and last of a logically contiguous series of memory storage locations where the sequential history of junction state data is stored, and a count of the number of objects currently having access to said junction state data;
   means for creating in said memory a junction accessor data structure for use by an object desiring to access said junction state data, said accessor data structure having indicators for said first of said logically contiguous memory storage locations of said junction descriptor data structure and for the next of said logically contiguous memory storage locations to be accessed by said object.

6. A program object to program object communication system as claimed in claim 5, further including:
   means for creating in said junction descriptor data structure an indicator for an event semaphore.

7. A program object to program object communication system as claimed in claim 6, further including:
   means for creating in said junction descriptor data structure an indicator for a mutual exclusion event semaphore.

8. A program object to program object communication system as claimed in claim 5 through 7, further including:
   means for creating in said memory an allocation of memory space for holding an indicator for the location in said memory of a sentinel cell indicating the end of said junction descriptor data structure.

9. An asynchronous program object to program object communications method comprising computer-executable steps in each said object, executable in a computer processor for:
   creating in said memory a junction descriptor data structure having indicators for the location in said memory of the first and last of a logically contiguous series of memory storage locations where the sequential history of junction state data is stored, and a count of the number of objects currently having access to said junction state data; and
   creating in said memory a junction accessor data structure for use by an object desiring to access said junction state data, said accessor data structure having indicators for said first of said logically contiguous memory storage locations of said junction descriptor data structure and for the next of said logically contiguous memory storage locations to be accessed by said object.

10. An asynchronous program object to program object communications method as claimed in claim 9, wherein:
    said creating of said junction descriptor data structure includes a step of creating in said junction descriptor data structure a mutual exclusion semaphore indicator.

11. An asynchronous program object to program object communications method as claimed in claim 10, wherein:
    said creating of said junction descriptor data structure includes a step of creating in said junction descriptor data structure an indicator for an event semaphore.

12. An asynchronous program object to program object communications method as claimed in claims 9 through 11, wherein:
    creating in said memory an allocation of memory space for holding an indicator for the location in said memory of a sentinel cell indicating the end of said junction descriptor data structure.

13. A system data-sharing between two or more program objects in a computer system having a processor, a memory accessible by said program objects, and an operating system program for controlling operations by said processor and said objects, said operating system program including program steps executable in said processor and invocable by said program objects, for:
    creating in said memory a junction descriptor data structure having indicators for the location in said memory of the first and last of a logically contiguous series of memory storage locations where the sequential history of junction state data is stored, and a count of the number of objects currently having access to said junction state data; and
    creating in said memory a junction accessor data structure for use by an object desiring to access said junction state data, said accessor data structure having indicators for said first of said logically contiguous memory storage locations of said junction descriptor data structure and for the next of said logically contiguous memory storage locations to be accessed by said object.

14. A system for data-sharing between two or more program objects as claimed in claim 13, wherein:

said creating of said junction descriptor data structure includes a step of creating in said junction descriptor data structure a mutual exclusion semaphore indicator.

15. A system for data-sharing between two or more program objects as claimed in claim 14, wherein:

said creating of said junction descriptor data structure includes a step of creating in said junction descriptor data structure an indicator for an event semaphore.

16. A system for data-sharing between two or more program objects as claimed in any one of claims 13 through 15, wherein:

creating in said memory an allocation of memory space for holding an indicator for the location in said memory of a sentinel cell indicating the end of said junction descriptor data structure.

17. An asynchronous, program object to program object communication method comprising computer-executable steps invocable from the computer operating system and executable in a processor, for:

creating in said memory a junction descriptor data structure having indicators for the location in said memory of the first and last of a logically contiguous series of memory storage locations where the sequential history of junction state data is stored, and a count of the number of objects currently having access to said junction state data; and creating in said memory a junction accessor data structure for use by an object desiring to access said junction state data, said accessor data structure having indicators for said first of said logically contiguous memory storage locations of said junction descriptor data structure and for the next of said logically contiguous memory storage locations to be accessed by said object.

18. An asynchronous, program object to program object communication method as claimed in claim 17, wherein:

said creating of said junction descriptor data structure includes a step of creating in said junction descriptor data structure a mutual exclusion semaphore indicator.

19. An asynchronous, program object to program object communication method as claimed in claim 18, wherein:

said creating of said junction descriptor data structure includes a step of creating in said junction descriptor data structure an indicator for an event semaphore.

20. An asynchronous, program object to program object communication method as claimed in claims 17 through 19, wherein:

creating in said memory an allocation of memory space for holding an indicator for the location in said memory of a sentinel cell indicating the end of said junction descriptor data structure.

* * * * *

UNITED STATES PATENT AND TRADEMARK OFFICE
CERTIFICATE OF CORRECTION

PATENT NO. : 6,587,889 B1
DATED : July 1, 2003
INVENTOR(S) : Kaminsky

It is certified that error appears in the above-identified patent and that said Letters Patent is hereby corrected as shown below:

Title page,
Item [*] Notice, delete "0" and insert -- 940 --.

Signed and Sealed this

Seventh Day of September, 2004

JON W. DUDAS
*Director of the United States Patent and Trademark Office*